United States Patent [19]

Zaghi

[11] 4,365,520
[45] Dec. 28, 1982

[54] STRAIN GAGE TRANSDUCERS
[75] Inventor: Hooshmand Zaghi, Oxnard, Calif.
[73] Assignee: Gould Inc., Rolling Meadows, Ill.
[21] Appl. No.: 223,068
[22] Filed: Jan. 7, 1981
[51] Int. Cl.³ ............................................... G01L 1/22
[52] U.S. Cl. ...................................... 73/862.63; 338/3
[58] Field of Search ...................... 73/766, 862.63, 708; 338/3

[56] References Cited
U.S. PATENT DOCUMENTS

| | | |
|---|---|---|
| 2,390,038 | 11/1945 | Ruge . |
| 2,672,048 | 3/1954 | Ruge . |
| 3,196,668 | 7/1965 | McLellan . |
| 3,245,016 | 4/1966 | Russell ..................................... 338/2 |
| 3,286,526 | 11/1966 | Mulcahy et al. ....................... 73/708 |
| 3,290,928 | 12/1966 | Curry . |
| 3,303,693 | 2/1967 | Stedman . |
| 3,341,796 | 9/1967 | Eisele ..................................... 338/5 |
| 3,448,607 | 6/1969 | Russell . |
| 3,609,625 | 9/1971 | Watanabe et al. ....................... 338/3 |
| 3,786,373 | 1/1974 | Schulz et al. . |
| 3,868,608 | 2/1975 | Williams . |
| 3,878,477 | 4/1975 | Dias et al. . |
| 3,916,348 | 10/1975 | Toda et al. . |
| 4,116,075 | 9/1978 | Ort ......................................... 73/708 |
| 4,299,130 | 11/1981 | Koneval ............................... 73/766 |

*Primary Examiner*—James J. Gill

[57] ABSTRACT

A strain gage transducer wherein a plurality of strain gages are mounted on surface portions of a beam. The beam finds a plurality of thermal conductivity paths for conducting heat from the strain gages. The physical configuration defined by the beam for the first thermal conductivity path differs from that defined by the beam for the second thermal conductivity path, while yet the paths are arranged to be substantially identical in effective thermal conductivity so that dissipation of heat from the strain gages is substantially similar. In the illustrated embodiment, such differential beam configuration is provided by inclusion in the beam of one or more cavities. In one form, at least one cavity extends fully through the beam, and in another form, at least one cavity defines a recess extending only partially through the beam. In the illustrated embodiment, the cavity structure may be used to control the heat sink characteristics of the different portions of the beam. Alternatively, the cavity configuration may be used to define different rates of heat flow characteristics in the heat flow paths.

14 Claims, 7 Drawing Figures

STRAIN GAGE TRANSDUCERS

BACKGROUND OF THE INVENTION

1. Field of the Invention

This invention relates to transducers and in particular to strain gage transducers wherein different temperature conditions may adversely affect operation of the apparatus.

2. Description of the Prior Art

In one form of strain gage transducer, a plurality of strain gages are mounted on the surface of a supporting body, illustratively comprising a beam, for producing electrical signals corresponding to strains induced in the supporting body. Such strain gage transducers may be made extremely accurate. However, it has been found that the accuracy thereof may be adversely affected by temperature differentials occurring in the apparatus and it has been conventional to provide in such apparatus temperature compensating means in order to minimize such adverse affect.

More specifically, an illustrative strain gage transducer, wherein strain gages are mounted on surface portions of a beam, is illustrated in U.S. Pat. No. 4,107,626 of David A. Kiewit, which patent is owned by the assignee hereof. The signal developed therein from the piezoelectric strain gage transducers utilize surface acoustic wave paths extending through the tension and compression portions of the beam surface. As disclosed in the Kiewit patent, the transducers may be formed by deposition using thin film techniques.

An early form of such strain gage is illustrated in U.S. Pat. No. 2,350,972 of Arthur C. Ruge, which teaches the use of materials having positive and negative thermal coefficients of resistance in forming the strain gage elements so as to provide an overall fixable temperature coefficient at any desired value between the two thermal coefficients. As shown in Ruge, the strain gage is generally symmetrical.

Herman T. Gay shows, in U.S. Pat. No. 3,184,962, a strain-type transducer which utilizes a single element resistant gage so that the transducer is compensated for changes in different parameters produced by changes in the ambient temperature. Gay points out that where two resistance elements are used in a resistant strain gage, one solution to the temperature differential problem is to cause the first resistance element to have a modulus of elasticity which increases with an increase in temperature and the other element to have a modulus of elasticity which decreases in the same proportion with an increase in temperature. Gay teaches that the characteristics of the strain sensitive material be combined with the characteristics of the strain material so as to produce substantially zero change in sensitivity and electrical resistance of the responsive material due to changes in temperature.

In U.S. Pat. No. 4,116,075 of Werner Ort, a transducer is disclosed wherein the strain gages are mounted either on a diaphragm or flexure spring mechanically coupled to a diaphragm. The diaphragm is mounted on a clamping ring and the strain gages are disposed at different distances from the clamping ring. Ort teaches that heat transfer from the different strain gages may be equalized relative to the clamping ring by varying the areas of the strain gages, the spacing of the conductors of the strain gages, the relative positioning of the strain gages, or the width of portions of the flexure spring. Alternatively, Ort suggests that slots may be provided adjacent the strain gages in the flexure spring and illustrates the use of such slots in a symmetrical arrangement in FIG. 6 of the patent. Alternatively, Ort teaches the use of a flexure spring having a pair of legs connecting a centerpiece to the clamping ring, with the structure again being raised in a symmetrical configuration, as shown in FIG. 7 of the patent.

SUMMARY OF THE INVENTION

The present invention comprehends an improved strain gage transducer wherein strain gages are mounted on different surface portions of the support body to produce changes in their electrical resistance as a function of the strain induced in the portion of the body to which they are mounted. The support body, in the illustrated embodiment, comprises a beam having an asymmetric configuration which would tend to provide differential thermal conductivity paths extending away from the respective strain gages. The invention comprehends arranging the physical configuration of the beam portions defining the two thermal conductivity flow paths such that, notwithstanding an asymmetrical configuration thereof, the dissipation from the strain gages is substantially similar.

More specifically, the invention comprehends the provision of such a transducer wherein a preselected physical asymmetry is caused to provide thermal symmetry.

The thermal symmetry may be effected by providing substantially similar heat sink capacity of the two portions of the beam defining the respective heat flow paths. Alternatively, the configuration may be arranged to provide substantially similar rates of heat flow through the two flow paths.

The desired thermal flow configuration of the body may be effected by providing one or more openings in one or both of the flow paths preselected to provide control of either or both of the heat sink and rate of flow characteristics discussed above.

In one illustrative embodiment, the control is effected by providing a through opening in one portion of the support body.

In another illustrative embodiment, the control is effected by providing a recess extending partially into the support body.

The cavities provided in the body may have any desired cross-sectional configuration, such as the circular, oval, polygonal cross sections of the several illustrated embodiments.

The transducer structure of the present invention is extremely simple and economical while yet providing a substantially improved functioning, avoiding the problems of the prior art structures in a novel and simple manner.

BRIEF DESCRIPTION OF THE DRAWING

Other features and advantages of the invention will be apparent from the following description taken in connection with the accompany drawing wherein.

DESCRIPTION OF THE PREFERRED EMBODIMENT

Figure 1:
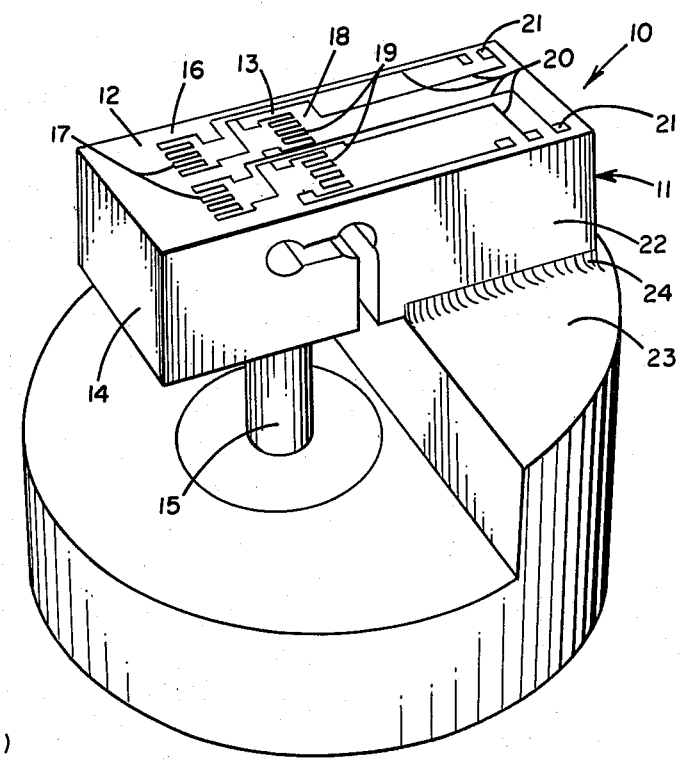
FIG. 1 is a perspective view of a strain gage transducer of the prior art, having a support body carrying a plurality of strain gages on different surface portions thereof.
Figure 2:
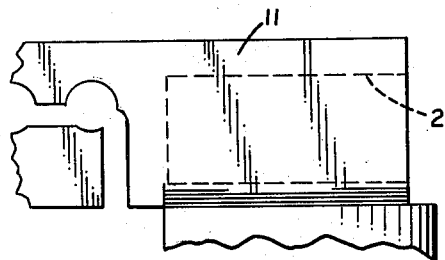
FIG. 2 is a fragmentary side elevation of such a strain gage transducer having a cavity in a portion of the support body defining one of the heat flow paths therein, the cavity being shown in broken lines as a recess extending partially through the support body to define an improved strain gage transducer embodying the invention.

In the exemplary embodiments of the invention as disclosed in the drawing, a strain gage transducer generally designated 10 of the prior art is shown to comprise a deformable support body 11 which illustratively comprises a beam having a tension portion 12 and a compression portion 13 resulting from the application of a force to one end 14 of the beam by a suitable force-applying means 15.

Mounted on a tension surface portion 16 of beam portion 12 is a first, tension strain gage structure 17 and mounted on a second, compression, surface portion 18 defined by beam portion 13, is a second, compression strain gage structure 19. The strain gage structures may comprise conventional resistive strain gage elements, which may be deposited on the surfaces as by conventional thin film deposition techniques.

Connecting conductors 20 may be further deposited on the beam to connect different portions of the strain gage structures to suitable paths 21 for making electrical connections to associated apparatus.

As further illustrated in FIG. 1, the conventional strain gage 10 of this type may have the opposite end portion 22 rigidly mounted to a mounting support 23 as by welding 24 so as to cooperate with the force-applying means 15 in effecting a flexure of the beam to be sensed by the strain gage structures 17 and 18.

As discussed above, a problem arises in the prior art strain gage structures of this type in that such structures may be subject to the transient error resulting from temperature gradients across the gage which would cause the gage to provide a false indication of strain. Conventionally, in the arrangement of FIG. 1, the strain gages are arranged in a Wheatstone bridge form of sensing circuit so that such temperature gradients across the strain gage cause the gage to appear to be unbalanced, even though not subjected to a strain force by the force-applying means 15. Further, the resistance of the strain gage materials conventionally varies as some function of the temperature thereof and conventionally exhibits a higher resistance at elevated temperatures. As discussed above, the prior art has attempted to resolve the problem by utilizing different materials in the strain gage elements so as to minimize such variable temperature-resistance characteristics. However, notwithstanding such attempts, a problem remains in that where the beam finds an asymmetrical physical configuration, thermal transfer from the different strain gage portions may adversely affect the temperature-resistance characteristics of the system so that the different strain gage elements may reside at different temperatures. One attempt to resolve this problem has been to electronically imbalance the bridge circuit so that it appears balanced when steady state temperatures are achieved. This solution has the unresolved problem, however, of producing errors during warmup and during conditions wherein other than steady state operation is effected.

The present invention comprehends a novel solution to this vexatious problem in the provision of means in the support body for causing the thermal conductivity paths from the respective strain gages to have substantially similar thermal conductivity, notwithstanding substantially different physical configurations thereof.

Figure 3:
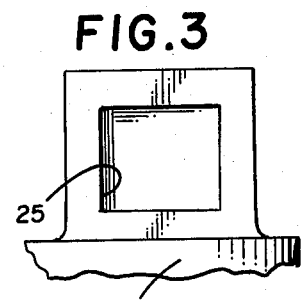
FIG. 3 is an end elevation of the transducer of FIG. 2.

Thus, as illustrated in FIG. 2-7, the invention comprehends the provision of one or more cavities in the beam portion 11 which, while causing the beam to have a further asymmetrical physical configuration, are preselected to cause the heat transfer paths from the respective strain gage structures to be similar in thermal transfer characteristics, thereby to cause the heat dissipation from the strain gages to be substantially similar. Thus, illustratively, in FIGS. 2 and 3, beam portion 11 is provided with a cavity 25 defined by a recess which extends partially into the beam portion 11. The invention comprehends that the recess have any suitable cross-sectional configuration and, as illustrated in FIG. 3, in one form, may have a polygonal cross-sectional configuration.

Figure 4:
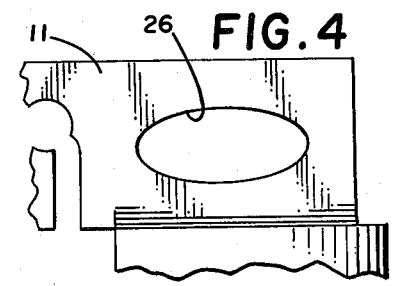
FIG. 4 is a fragmentary side elevation of a modified form of transducer embodying the invention having a cavity defined by a through opening in the support body.
Figure 5:
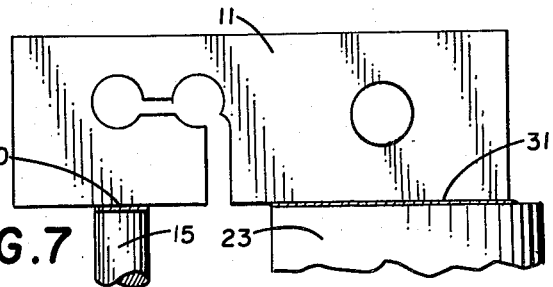
FIG. 5 is a fragmentary side elevation similar to that of FIG. 4 but illustrating such a transducer having another form of through opening.

The invention comprehends that the cavity may comprise a through cavity extending fully through the beam. Thus, as illustrated in FIG. 4, cavity 26 comprises an opening extending transversely fully through the beam and having an oval cross-sectional configuration. In FIG. 5, the opening 27 extending through the beam is shown to have a circular configuration. Such cross-sectional configurations are illustrative only. Further, the invention comprehends that one or more of the different cavities be provided in the beam. Where a plurality of cavities are provided, they may be of any suitable form as to cross section and extend into or through the beam so as to provide the desired equalization of the thermal conductivity characteristics of the flow paths.

More specifically, the invention comprehends that the provision of the cavities in the beam cause the flow path of heat from the tension strain gage structure 17 through the tension portion 14 of the beam to have similar heat dissipation characteristics relative to the flow path of heat from the compression strain gage structure 19 through the second portion 22 of the beam 11, notwithstanding the different physical configurations thereof.

Figure 6:
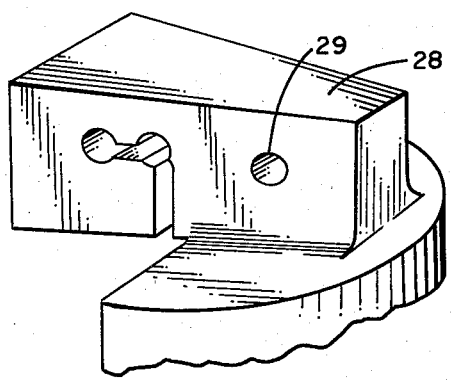
FIG. 6 is a fragmentary perspective view illustrating another form of transducer embodying the invention wherein the support body has a tapered configuration.

As further illustrated in FIG. 6, the support body, or beam 28, may comprise a beam generally similar to beam 11, but having a tapering cross-sectional configuration which, in cooperation with a suitable cavity, such as cavity 29 therein, provides the desired coordination of the heat transfer characteristics of the two flow paths to obtain the desired similar heat dissipation characteristics thereof. The tapered configuration of FIG. 6 is exemplary only, as will be obvious to those skilled in the art, in providing further asymmetrical physical configuration characteristics of the beam preselected to provide the desired heat flow characteristics.

Figure 7:
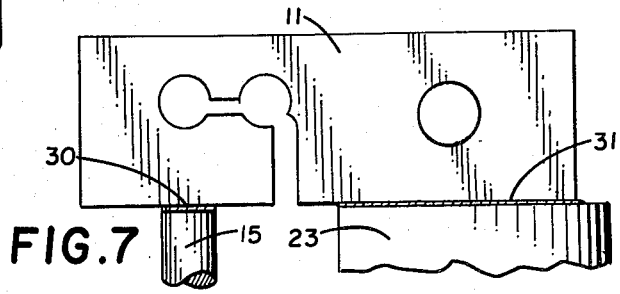
FIG. 7 is a fragmentary side elevation of a transducer embodying the invention wherein the support body is effectively thermally insulated from associated apparatus by an insulating adhesive layer.

As illustrated in FIG. 7, the beam may be insulated from the force-applying means 15 and support 23 as by provision of suitable adhesive mounting means 30 and 31, respectively.

The end portions 14 and 22 of the support body beam effectively define heat sinks for receiving the thermal energy conducted from the respective strain gage structures 17 and 18. Thus, the invention comprehends, in one form, the provision of suitable cavities in the beam to cause the two heat sinks to have substantially equal capacity notwithstanding the substantially different physical configuration of the two portions of the beam. Alternatively, the invention comprehends that the provision of the cavities be preselected to cause the cross-sectional configuration of the beam defining the respective flow paths to be such as to cause the rate of flow of heat from the respective strain gages 17 and 18 to be similar, notwithstanding different heat sink capacities of the beam portions. Such structure, illustratively, may be utilized where the beam portion 22 has a relatively highly thermally conductive connection to the support 23 as by welding 24, illustrated in FIG. 1.

As will be obvious to those skilled in the art, the invention comprehends the provision of such cavities which may combine the desirable features of controlled heat sink capacity and cross-sectional configuration heat flow rate control characteristics to cooperatively provide the desired similar heat dissipation characteristics of the asymmetrical structure.

The foregoing disclosure of specific embodiments is illustrative of the broad inventive concepts comprehended by the invention.

I claim:

1. In a transducer having first and second strain gages, the improvement comprising:

a thermally conductive deformable beam defining a first surface portion on which the first strain gage is mounted and a second surface portion on which the second strain gage is mounted, said beam defining a first thermal conductivity path from said first gage and a second thermal conductivity path from said second gage which is different in physical configuration from the physical configuration of said first path, said paths being arranged to be substantially identical in effective thermal conductivity notwithstanding said different physical configurations whereby heat dissipation from said strain gages is substantially similar, wherein said beam comprises a block having cavities associated with the different thermal conductivity paths therein, the cavities associated with said first path being different from the cavities associated with said second path, said first path defining a first heat receiving sink and said second path defining a second heat receiving sink which while having said different physical configuration has a thermal energy storage capacity similar to that of said first sink.

2. In a transducer having first and second strain gages, the improvement comprising:

a thermally conductive deformable beam defining a first surface portion on which the first strain gage is mounted and a second surface portion on which the second strain gage is mounted, said beam defining a first thermal conductivity path from said first gage and a second thermal conductivity path from said second gage which is different in physical configuration from the physical configuration of said first path, said paths being arranged to be substantially identical in effective thermal conductivity notwithstanding said different physical configurations whereby heat dissipation from said strain gages is substantially similar, wherein said beam comprises a block having cavities associated with the different thermal conductivity paths therein, the cavities associated with said first path being different from the cavities associated with said second path, said first path defining a first heat receiving sink and said second path defining a second heat receiving sink which has a thermal energy storage capacity different from that of said first sink, said beam further defining means for causing the rate of heat flow from said strain gages in said first and second paths to said different capacity sinks to be substantially equal.

3. In a transducer having first and second strain gages, the improvement comprising:

a thermally conductive deformable beam defining a first surface portion on which the first strain gage is mounted and a second surface portion on which the second strain gage is mounted, said beam defining a first thermal conductivity path from said first gage and a second thermal conductivity path from said second gage which is different in physical configuration from the physical configuration of said first path, said paths being arranged to be substantially identical in effective thermal conductivity notwithstanding said different physical configurations whereby heat dissipation from said strain gages is substantially similar, wherein said beam comprises a block having cavities associated with the different thermal conductivity paths therein, the cavities associated with said first path being different from the cavities associated with said second path, said first path defining a first heat receiving sink and said second path defining a second heat receiving sink which has a thermal energy storage capacity different from that of said first sink, said beam further defining cross-sectional areas of thermally conductive material in said first path different from cross-sectional areas of thermally conductive material in said second path comprising means for causing the rate of heat flow from said strain gages in said first and second paths to said different capacity sinks to be substantially equal.

4. In a transducer having first and second strain gages, the improvement comprising:

a thermally conductive deformable beam comprising a block and defining a first surface portion on which the first strain gage is mounted and a second surface portion on which the second strain gage is mounted, said beam defining a first thermal conductivity path from said first gage and a second thermal conductivity path from said second gage, said beam being provided with at least one cavity in the portion thereof defining said second path causing said second path to define a different physical configuration from the physical configuration of said first path, said first path defining a first heat receiving sink and said second path defining a second heat receiving sink, said paths, including said sinks, being arranged to be substantially identical in effective thermal conductivity notwithstanding said different physical configurations whereby heat dissipation from said strain gages is substantially similar.

5. The strain gage transducer of claim 4 wherein at least one cavity comprises at least one opening extending fully through the beam.

6. The strain gage transducer of claim 4 wherein said at least one cavity comprises at least one recess extending less than fully through the beam.

7. The strain gage transducer of claim 4 wherein said at least one cavity comprises at least one recess extending less than fully through the beam and opening outwardly therefrom.

8. The strain gage transducer of claim 4 wherein the beam defines a parallelepiped configuration.

9. The strain gage transducer of claim 4 wherein the beam defines a tapered configuration.

10. The strain gage transducer of claim 4 wherein said at least one cavity comprises at least one cavity having a circular cross section.

11. The strain gage transducer of claim 4 wherein said at least one cavity comprises at least one cavity having an oval cross section.

12. The strain gage transducer of claim 4 wherein said at least one cavity comprises at least one cavity having an arcuate cross section.

13. The strain gage transducer of claim 4 wherein said at least one cavity comprises at least one cavity having a polygonal cross section.

14. The strain gage transducer of claim 4 wherein said at least one cavity comprises at least one cavity having a square cross section.

* * * * *